United States Patent Office 2,802,853
Patented Aug. 13, 1957

2,802,853

SULFUR-CONTAINING ORGANOSILICON COMPOUNDS AND THEIR PREPARATION

Philip D. George, Schenectady, N. Y., assignor to General Electric Company, a corporation of New York No Drawing. Application October 3, 1955,
Serial No. 538,285

9 Claims. (Cl. 260—448.2)

This invention relates to organosilicon compounds containing sulfur linked to silicon through aliphatic carbon and to the preparation of these compounds. More particularly, this invention relates to sulfur-containing organosilicon compounds having the formula (1)  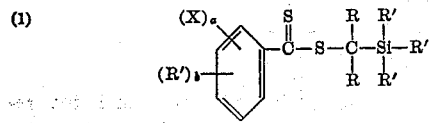

where R is hydrogen or alkyl, e. g., methyl, ethyl, propyl, butyl, isobutyl, octyl, etc.; R' is alkyl as previously defined for R, X is halogen, e. g., fluorine, chlorine, bromine, etc.; $a$ is a whole number equal to from 0 to 4, inclusive; and $b$ is a whole number equal to from 0 to 1, inclusive.

This invention is also concerned with organopolysiloxanes in which each molecule contains at least one silicon-bonded (2)  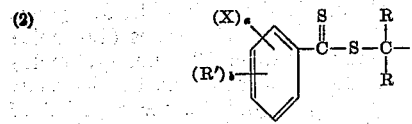

radical with the remaining valences of silicon other than the valences in the siloxane chain being satisfied by alkyl, preferably methyl radicals. In the above formula R, R', X, $a$ and $b$ are as defined above.

In the conventional preparation of alkyl-substituted aromatic compounds by the Friedel-Crafts reaction, an aromatic compound such as benzene is reacted with an alkyl halide, such as n-amyl chloride, in the presence of aluminum chloride and a suitable solvent such as carbon disulfide. This results in the substitution of the alkyl radical for one of the aromatic hydrogens. Unexpectedly I have discovered that when this same reaction is applied to organosilicon compounds containing silicon-bonded chloroalkyl radicals, instead of forming a product containing a silyl alkyl radical attached to an aromatic nucleus, the product is a silylalkyl arylcarbithioate. Thus, products within the scope of Formula 1 may be prepared by effecting reaction between a silane (hereinafter referred to as an α-chloroalkyl silane) having the following formula (3)  

and an aromatic compound having the following formula (4)  

in the presence of aluminum chloride, AlCl₃, and carbon disulfide. In Formulae 3 and 4, R, R', X, $a$ and $b$ have the meaning discussed above in connection with Formula 1.

Among the α-chloroalkyl silanes within the scope of Formula 3 are chloromethyltrimethylsilane, α-chloroethyltrimethylsilane, trimethylsilyldimethylchloromethane, etc. These α-chloroalkylsilanes are well known in the art and are prepared, for example, from the corresponding alkylsilane by merely contacting the latter with chlorine or other suitable halogen.

The aromatic compounds within the scope of Formula 4 are also well known in the art and those containing halogen are prepared, for example, by the halogenation of benzene or various alkyl benzenes. Among the aromatic compounds within the scope of Formula 3 may be mentioned benzene, monochlorobenzene, dichlorobenzene, tetrachlorobenzene, bromobenzene, o-chlorotoluene, p-chlorotoluene, etc.

Organopolysiloxanes within the scope of the present invention include those containing one or more structural units having the formula

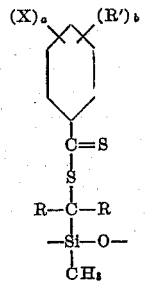

or the structural unit

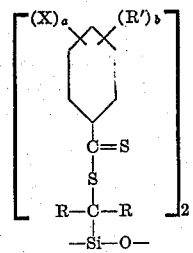

alone or intercondensed with other siloxane units, such as, for example, dimethylsiloxane units, methylphenylsiloxane units, etc. These organopolysiloxanes may be either cyclic compounds containing three or more, e. g., three to ten, silicon atoms or may be linear chain-stopped organopolysiloxanes whose chains are terminated by monofunctional units, such as, for example, trimethylsiloxane radicals, triethylsiloxane units, etc. These linear chain-stopped materials may contain from 2 to 100 or more intercondensed siloxane units.

In the preparation of the silylalkyl arylcarbithioates of Formula 1 by reaction between an α-chloroalkyl silane within the scope of Formula 3, an aromatic compound within the scope of Formula 4, aluminum chloride and carbon disulfide, the proportions of the ingredients are not critical and may vary within wide limits. Based on the number of moles of the α-chloroalkyl silane, I prefer to employ at least one mole of aluminum chloride. In general, I have found that amounts of from 1 to 10 or more moles of aluminum chloride per mole of the α-chloroalkyl silane are satisfactory. The amount of carbon disulfide or of the aromatic compound within the scope of Formula 4 may also vary within extremely wide limits because of the fact that either of these two ingredients may be employed as a solvent for the reaction mixture. Thus, in the case of the carbon disulfide, I prefer to employ at least 1 mole per mole of the α-chloroalkyl silane because of stoichiometric considerations. However, I may use up to 100 or more moles where it is desired that the carbon disulfide act as both a reactant and as the solvent for the reaction mixture.

In the case of the aromatic compound within the scope of Formula 4 I also employ at least one mole per mole of the α-chloroalkyl silane since this again is the amount which stoichiometry requires. However, in the case of the aromatic compound I may also use up to 100 or more moles per mole of the α-chloroalkyl silane when the aromatic compound is to be employed as both the reactant and as the solvent in the reaction medium. It should also be understood that large molar excesses of both the aromatic compound within the scope of Formula 4 and of carbon disulfide may be employed at the same time in the reaction of the present invention.

The reaction of the present invention may be carried out by forming a mixture of carbon disulfide, aluminum chloride, the aromatic compound within the scope of Formula 4 and the α-chloroalkyl silane within the scope of Formula 3, and heating the reaction mixture until reaction has been effected. The temperature at which the reaction is heated is not critical and may vary within wide limits. However, since the rate of reaction does increase with increasing temperature, I prefer to conduct the reaction at the reflux temperature of the reaction mixture under atmospheric conditions. At this reflux temperature, good agitation of the reaction mixture is obtained and the reaction rate is sufficiently fast so that the reaction is completed in a few hours. General temperature ranges which have been satisfactory in conducting the reaction of the present invention include temperatures from about 40 to 150° C. The reflux temperature, of course, varies to some extent with the particular reactants employed.

In the initial stages of the reaction it is found that the aluminum chloride forms a suspension in the other reactants. However, as the reaction proceeds, the aluminum chloride gradually goes into solution and at the same time a bright red lower layer is formed in the reaction mixture. This lower layer contains the desired silylalkyl arylcarbithioate. After all of the aluminum chloride has gone into solution and the size of the bright red lower layer remains constant, the reaction is completed. This red layer is then separated from the rest of the reaction mixture and may then be mixed with water or ice to hydrolyze any unreacted aluminum chloride or complexes present. This generally results in an aqueous layer and a lower bright red organic layer. The lower red layer is then fractionally distilled or steam distilled to obtain the pure product. Although this reaction has been described previously as being run under atmospheric pressure, the use of subatmospheric or superatmospheric pressures is not precluded.

Organopolysiloxanes containing silicon-bonded radicals within the scope of Formula 2 may be formed by a method similar to that employed in preparing compounds within the scope of Formula 1 except that in place of the α-chloroalkysilanes of Formula 3 silanes are employed which contain both a silicon-bonded chloroalkyl radical and a silicon-bonded halogen such as fluorine, chlorine, bromine, etc. Thus, the organopolysiloxanes of the present invention may be prepared by heating a mixture of an aromatic compound within the scope of Formula 4, aluminum chloride, carbon disulfide, and a silane which contains at least one α-chloroalkyl radical attached to silicon and at least one hydrolyzable group attached to silicon.

Siloxanes are formed by the process of the present invention when silanes containing both silicon-bonded α-chloroalkyl radicals and silicon-bonded hydrolyzable radicals since the hydrolyzable radicals are hydrolyzed and condensed under the conditions of the reaction. Thus, where the α-chloroalkylsilane contains one silicon-bonded hydrolyzable group a disiloxane is formed and where the α-chloroalkyl silane has two or three silicon-bonded hydrolyzable groups the siloxanes contain a large number of siloxane units.

In preparing organopolysiloxanes by the method of the present invention employing a compound such as chloromethyldimethylchlorosilane which has one chloroalkyl radical and one chlorine attached to silicon, the resulting product will be a disiloxane containing a radical within the scope of Formula 2 attached to each silicon atom and with two methyl radicals also attached to each silicon. Where the silane contains two hydrolyzable groups such as chloromethylmethyldichlorosilane, the resulting product will contain a number of recurring structural units having the formula

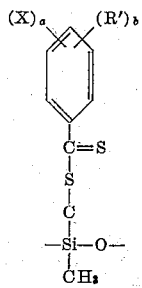

The proportion of ingredients employed and the reaction conditions employed in preparing these organopolysiloxanes are identical to the proportions and reaction conditions employed with compounds of Formula 1.

The following examples are illustrative of the practice of my invention and are not for purposes of limitation.

*Example 1*

Into a round-bottomed flask fitted with a reflux condenser protected by a drying tube, was placed 136 grams (1.0 mole) of anhydrous aluminum chloride, 379 grams (4.99 moles) of carbon disulfide, 122 grams (1.0 mole) of chloro-methyltrimethylsilane, and 78 grams (1.0 mole) of benzene. This mixture was then heated at its reflux temperature, which was about 48° C., for a period of about 4 hours. During the initial stages of the reaction the aluminum chloride gradually went into solution and a lower red layer formed whose volume remained constant at the end of the reaction. The entire reaction mixture was poured on cracked ice and the lower red layer was separated with the aid of ether. This layer was then dried with anhydrous sodium sulfate and fractionally distilled at atmospheric pressure to remove most of the unreacted materials. The residue was then distilled at a pressure of about 1 mm. to give trimethylsilylmethyl dithiobenzoate which has the formula

and which boiled at 95° C. at 0.1 mm. and had a refractive index of about 1.5987. Chemical analysis of this product showed it to contain 52.3 percent carbon, 7.4 percent hydrogen, 26.1 percent sulfur and 13.6 percent silicon as compared with the theoretical values of 54.9 percent carbon, 6.7 percent hydrogen, 26.7 percent sulfur, and 11.7 percent silicon.

In another preparation employing the same amounts of the same reactants as employed above, the lower layer which was present after the hydrolysis of the aluminum chloride was steam distilled to form trimethylsilylmethyl dithiobenzoate which had the same physical characteristics as the material prepared above.

*Example 2*

Following the procedure of Example 1, the following mixture was refluxed at a temperature of about 50° C. for 6 hours: 0.2 mole of chloromethyltrimethylsilane, 0.2 mole of anhydrous aluminum chloride, 0.2 mole of carbon disulfide and 0.68 mole of benzene. After hydrolyzing the reaction mixture by pouring it on cracked ice, washing it successively with water, aqueous potassium hydroxide, and water again, the product was dried with anhydrous sodium sulfate, and distilled to yield trimethylsilylmethyl dithiobenzoate having the same physical properties described in Example 1.

Example 3

Following the procedure of Example 1, 0.2 molar quantities of chloromethyltrimethylsilane, chlorobenzene and anhydrous aluminum chloride were refluxed at a temperature of about 50° C. in 1.0 mole of carbon disulfide. At the end of about 4 hours the product was poured on cracked ice and washed with water, aqueous KOH, and water again until neutral. The product was then dried over anhydrous sodium sulfate and distilled to yield trimethylsilylmethyl dithiochlorobenzoate, having the formula $$ClC_6H_4CS_2CH_2Si(CH_3)_3$$

which distilled at between 115 and 141° C. at 0.1 mm. This compound had a refractive index of 1.5567 and contained 23.5 percent sulfur as compared with the theoretical value of 23.3 percent sulfur.

Example 4

This example describes the preparation of an organopolysiloxane within the scope of the present invention. This composition was prepared by refluxing 0.2 mole of chloromethylmethyldichlorosilane, 0.2 mole of benzene, 0.2 mole of aluminum chloride, and 1.0 mole of carbon disulfide over a six-day period. The product was poured on cracked ice, washed successively with water, aqueous potassium hydroxide, and water and then dried and distilled. After distillation of the low boiling materials there remained a gum consisting of the recurring structural unit $$—Si(CH_3)(C_6H_5CS_2CH_2)O—$$

Chemical analysis of this gum showed it to contain 43.9 percent carbon, 4.9 percent hydrogen and 16.6 percent silicon as compared with the theoretical values of 47.8 percent carbon, 4.5 percent hydrogen and 12.4 percent silicon.

Although the present invention has been described primarily in connection with α-chloroalkylsilanes containing only one silicon-bonded α-chloroalkyl radical, it should be understood that the invention is also applicable to silanes containing more than one of such radicals. Thus, in a case of a material such as bis-(chloromethyl)-dimethyl-silane, an aromatic compound such as benzene, carbon disulfide and aluminum chloride, it is possible to prepare compounds containing two dithiobenzoate radicals attached to silicon through methyl. Furthermore, polymeric materials may be prepared from silanes containing both an α-chloroalkyl radical attached to silicon and an aryl radical attached to silicon. Thus, by effecting reaction between a silane such as phenyldimethylchloromethylsilane and carbon disulfide and aluminum chloride, a polymer having the recurring structural unit $$—CH_2—Si(CH_3)_2C_6H_4C(S)S—$$

is formed.

Although the invention has been described in connection with aromatic compounds within the scope of Formula 4, it should be understood that in place of these aromatic compounds aliphatic hydrocarbons may be employed. These hydrocarbons include, for example, isooctane, octene-1, n-octane, decane, etc. This results in silanes and siloxanes similar to those previously described except that the aromatic hydrocarbon or substituted aromatic hydrocarbon nucleus is replaced by an aliphatic hydrocarbon nucleus.

The products of the present invention may be converted to thiol esters by effecting reaction between these products and a mild oxidizing agent. Among the mild oxidizing agents may be mentioned, ozone, dilute aqueous nitric acid, etc.

The products of the present invention are useful for many of the normal silicone fluid applications such as, for example, as heat transfer media, as hydraulic fluids, and as lubricants, and lubricant additives.

In particular, the compound trimethylsilylmethyl dithiobenzoate has been found to be an outstanding lubricity additive for a silicone oil containing both methyl and tetrachlorophenyl radicals attached to silicon. Thus, when a tetrachlorophenyl methylsilicone oil as described was rotated between two V-shaped jaws held together by a force of 160 pounds, with both of the jaws and the rod being made of steel, bad wear occurred. When a modified oil was prepared by adding 4 percent by weight of trimethylsilylmethyl dithiobenzoate to the same tetrachlorophenyl methyl oil, no wear was observed under an 800 pound force. To obtain the same wear with this modified oil as with the unmodified oil, a force of 1800 pounds on the jaws was required. As a further illustration of this lubricating effect of trimethylsilylmethyl dithiobenzoate, the unmodified tetrachlorophenyl methylsilicone oil was rotated at a constant speed and with a constant maximum torque between V-shaped jaws maintained under a pressure which gradually increased. At a pressure of about 1000 to 1500 pounds, the jaws seized the rod so that further rotation was impossible. Employing this same apparatus on the same conditions with the modified oil previously described, there was no seizure of the rod until a force of 3000 pounds had been applied to the jaws.

What I claim as new and desire to secure by Letters Patent of the United States is:

1. An organosilicon compound having the formula

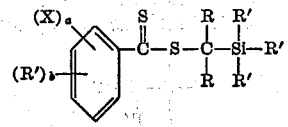

where R is a member selected from the class consisting of hydrogen and alkyl radicals, R' is alkyl, X is halogen, a is a whole number from 0 to 4, inclusive, and b is a whole number from 0 to 1.

2. Trimethylsilylmethyl dithiobenzoate having the formula $$C_6H_5CS_2CH_2Si(CH_3)_3$$

3. Trimethylsilylmethyl dithiochlorobenzoate having the formula $$ClC_6H_4CS_2CH_2Si(CH_3)_3$$

4. The method of preparing an organosilicon compound having the formula

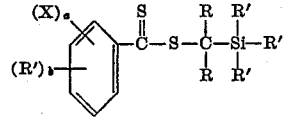

which comprises refluxing a mixture of (a) carbon disulfide, (b) aluminum chloride, (c) a silane having the formula

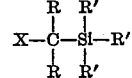

and (d) an aromatic compound having the formula

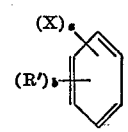

where R is a member selected from the class consisting of hydrogen and alkyl radicals, R' is alkyl, X is halogen, a is a whole number from 0 to 4, inclusive, and b is a whole number from 0 to 1, inclusive.

5. The method of forming trimethylsilylmethyl dithiobenzoate which comprises heating a mixture of benzene, chloromethyltrimethylsilane, carbon disulfide, and aluminum chloride.

6. The method of preparing trimethylsilylmethyl dithiochlorobenzoate which comprises heating a mixture of chlorobenzene, chloromethyltrisilane, carbon disulfide, and aluminum chloride.

7. Organopolysiloxanes in which each silicon atom contains at least one silicon-bonded

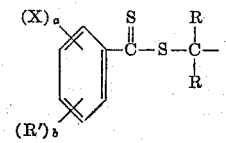

radical where R is a member selected from the class consisting of hydrogen and alkyl radicals, R' is an alkyl radical, X is a halogen, $a$ is a whole number equal to from 1 to 4, inclusive, and $b$ is a whole number equal to from 0 to 1, inclusive, with the remaining valences of silicon other than the valences in the siloxane chain being satisfied by methyl radicals.

8. The method of preparing an organosilicon compound having the formula

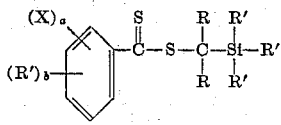

which comprises heating at a temperature of from about 40° C. to 150° C. a mixture of (a) carbon disulfide, (b) aluminum chloride, (c) a silane having the formula

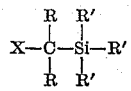

and (d) an aromatic compound having the formula

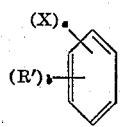

where R is a member selected from the class consisting of hydrogen and alkyl radicals, R' is alkyl, X is halogen, $a$ is a whole number from 0 to 4, inclusive, and $b$ is a whole number from 0 to 1, inclusive.

9. A sulfur containing organosilicon composition selected from the class consisting of (A) an organosilicon compound having the formula

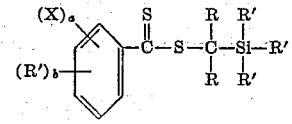

and (B) an organopolysiloxane in which each silicon atom contains at least one silicon-bonded

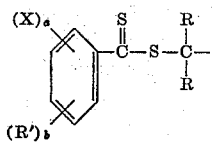

radical with the remaining valences of silicon other than the valences in the siloxane being satisfied by methyl radicals, where R is a member selected from the class consisting of hydrogen and alkyl radicals, R' is alkyl, X is halogen, $a$ is a whole number equal to from 1 to 4, inclusive, and $b$ is a whole number equal to from 0 to 1, inclusive.

No references cited.